(12) United States Patent
Ahn et al.

(10) Patent No.: US 7,327,685 B2
(45) Date of Patent: Feb. 5, 2008

(54) APPARATUS FOR IMPLEMENTATION OF ADAPTIVE ROUTING IN PACKET SWITCHED NETWORKS

(75) Inventors: Jin-Ho Ahn, Seoul (KR); Sung-Il Bae, Goyang-Si (KR); Young-Yong Kim, Seoul (KR); Sung-Ho Kang, Seoul (KR)

(73) Assignee: Industry-Academic Cooperation Foundation, Yoosei University, Seodaemoon-Gu, Seoul (KR)

( * ) Notice: Subject to any disclaimer, the term of this patent is extended or adjusted under 35 U.S.C. 154(b) by 672 days.

(21) Appl. No.: 10/937,369

(22) Filed: Sep. 10, 2004

(65) Prior Publication Data

US 2006/0056302 A1    Mar. 16, 2006

(51) Int. Cl.
*H04L 12/56* (2006.01)
*H04J 3/23* (2006.01)
*G06F 15/173* (2006.01)

(52) U.S. Cl. ............... 370/238; 370/392; 370/474; 709/241

(58) Field of Classification Search ............ 370/238, 370/238.1, 351, 389, 392, 474, 475; 709/238–244
See application file for complete search history.

(56) References Cited

U.S. PATENT DOCUMENTS 5,452,294 A * 9/1995 Natarajan ............... 370/351

6,940,832 B2 * 9/2005 Saadawi et al. ............ 370/328

FOREIGN PATENT DOCUMENTS

KR        2006018585 A  *  3/2006

OTHER PUBLICATIONS

Di Caro et al., AntNet: Distributed Stigmergetic Control for Communications Network, 1998, Journal of Artificial Intelligence Research 9 (1998), pp. 317-365.*
Zheng et al., An Ant-Based Distributed Routing Algorithm for Ad-hoc Networks, 2004, Communications, Circuits and Systems, International Conference on vol. 1, Jun. 27-29, 2004, pp. 412-417.*
Gabber et al., Trail Blazer: A Routing Algorithm Inspired by Ants, 2004, Network Protocols, Proceedings of the 12th IEEE International Conference on 2004, pp. 36-47.*

* cited by examiner

*Primary Examiner*—Chi Pham
*Assistant Examiner*—Tri H. Phan
(74) *Attorney, Agent, or Firm*—GWiPS

(57) ABSTRACT

An apparatus is invented for implementing adaptive routing in packet switched networks. The hardware structure of the apparatus is based on the AntNet, which is an adaptive routing algorithm for selecting an optimized network route using a mobile agent that simulates an ant. The AntNet-based hardware structure can be applied to a system-on-chip system. The original AntNet algorithm is adapted for hardware implementation. Performance of the modified algorithm of the invention was verified by comparing the modified algorithm with the original AntNet algorithm in a virtual network structure. The hardware structure of the invention is effective for AntNet-based routing.

6 Claims, 12 Drawing Sheets

P : Probability
f : Visited node by a current ant
n : Other nodes except f
d : Destination node of a current ant (a) SimpleNet  (b) NSFNet (a) Original Algorithm (b) Modified Algorithm (a) Original Algorithm (b) Modified Algorithm (a) Original Algorithm (b) Modified Algorithm (a) Original Algorithm (b) Modified Algorithm (a) Original Algorithm

*P from 1 to 12* ——— *P from 3 to 12* ——— *P from 4 to 12*

(b) Modified Algorithm

*P from 1 to 12* ——— *P from 3 to 12* ——— *P from 4 to 12*

(a) Original Algorithm

P from 1 to 12 ——— P from 3 to 12 ——— P from 4 to 12

(b) Modified Algorithm

P from 1 to 12 ——— P from 3 to 12 ——— P from 4 to 12

APPARATUS FOR IMPLEMENTATION OF ADAPTIVE ROUTING IN PACKET SWITCHED NETWORKS

BACKGROUND OF THE INVENTION

1. Field of the Invention

The present invention relates to an apparatus for embodying the AntNet algorithm that applies ecosystem colony characteristics to network environments in hardware. The apparatus according to the present invention can be constructed as a system-on-chip (SoC) system.

2. Related Prior Art

Most existing network techniques are based on high-performance apparatuses and experienced managers. Thus, network design and maintenance costs are rapidly increasing to meet the requirements of continuously increasing network size and traffic. Recently, there have been explored a variety of methods for effectively managing rapid traffic processing and communication networks and, simultaneously, minimizing infrastructure construction costs by reusing existing equipment to cope with incessantly evolving network techniques. Among the methods, a method of applying various behavior patterns of social insects that form a colony to actual situations is recognized as an excellent and effective method.

Colony characteristics of insects can be simply defined as a collective behavior of individuals. Individual objects organize a group and carry out complicated tasks such as making a nest or seeking for food. Although each individual carries out a small task, small efforts are collected to address large and complicated problems.

To analyze the behavior pattern of ants that form a colony and have the largest number of individuals on the earth and apply the behavior pattern to actual various situations to find an optimized method is the ant colony optimization (ACO) theory [M. Dorigo, G, Di Caro and L. M. Gambardella, "Ant Algorithm for Discrete Optimization," Artificial Life, Vol. 5, No. 3, pp. 137-172, 1999; E. bonabeau, M. Dorigo and G. Theraulaz, "Inspiration for Optimization from Social Insect Behavior," Nature, Vol. 406, pp. 39-42, July 2000]. According to the ACO theory, there was proposed a successful approach to a problem such as the "Traveling Salesman Problem", which models foraging using pheromones among various characteristics of the ant [M. Dorigo, V. Maniezzo, and A. Colorni, "The Ant System: Optimization by a Colony of Cooperating Agents," IEEE Trans. on Systems, Man and Cybernetics-Part B, Vol. 26, No. 1, pp. 1-13, 1996; M. Dorigo and L. M. Gambardella, "AntColony System: A Cooperative Learning Approach to the Traveling Salesman Problem," IEEE Trans. on Evolutionary Computation, Vol. 1, No. 1, pp. 53-66, April 1997].

A communication network is an application field to which the ACO theory has been successfully applied so far because the ant's behavior pattern can be nearly completely applied to the actual network environment by modeling a network node and traffic as an ant nest and ants, respectively. Accordingly, the network environment to which the ACO mechanism is applied has characteristics including adaptability and stability for unpredictable situations and distributed processing capability through a self-organization function, which are features required for next-generation networks. Schoonderwored proposed a routing and load balancing technique in line switching networks using the ACO [R. Schoonderwored, O. Holland, J. Bruten, and L. Rothkrantz, "Ant-based Load Balancing in Telecommunications networks," Adaptive Behavior, Vol. 5, No. 2, pp. 169-207, 1996], and Di Caro and Dorigo developed an adaptive routing technique called AntNet [G. Di Caro and M. Dorigo, "AntNet: Distributed Stigmergetic control for Communications Networks," Journal of Artificial Intelligence Research 9, pp. 317-365, December 1998].

"AntNet" is an algorithm of choosing a relatively satisfactory route for a mobile agent defined as an "Ant" in variable network environments. Here, the "Ant" is a network packet that models the foraging habit of the ant colony. The foraging habit of the ant finds food and secretes pheromones along a route through which an ant has moved to reach the position where the food was found, to make other ants move to the place where the pheromones have been secreted. In this manner, an optimized route through which lots of ants are moved is naturally provided. The AntNet collects various routes and relatively appraises each route using Ant packets. Each node forwards general network data along a relatively satisfactory network route based on the appraised result.

The basic concept of the AntNet will now be explained.

The AntNet uses an agent packet called Ant in order to investigate a network environment. The types of Ant include a forward Ant and a Backward Ant. The forward Ant has the same priority as that of general network data and stores routing information in each node while moving from an initially generated node to a destination mode. The forward Ant becomes a backward Ant when it arrives at the destination. The backward Ant provides information about an optimum route for the general network data using the routing information stored in each node while returning the way the forward Ant has come. Each node has two kinds of storage places for storing the routing information. One of the storage places is a local traffic model that stores statistical data about network states and the other one is a routing table that stores routing preferences for the next nodes that should be passed through to move from a current node to a specific destination node. The preferences are represented by a normalized probability from 0 to 1. The sum of the next node preferences for destination nodes is 1. The higher the preference of a node becomes, the higher the probability becomes that an Ant will select the node in order to go to a corresponding destination node. A next node is finally decided upon with reference to the relative preference of the node and the length of an output queue that should be passed in order to go to the next node. Assume that P'nd is the probability of selecting a next node n in order to reach a destination node d. The P'nd is decided as the sum of the preference Pnd for the next node n, stored in a routing table, and the length In of the output queue that must be passed to reach the next node n. The In is a prior value and decides a weight. When |N| is the total number of next nodes connected to the current node, the P'nd can be represented as follows.

$$P'nd = \frac{Pnd + \alpha ln}{1|\alpha(|N|-1)}$$ [Equation 1]

The preferences stored in the routing tables are updated by the backward Ant. The range of updating the preferences is decided by a reinforcement value r. The reinforcement value is a parameter that represents the relative speed of routing information. The reinforcement value r is represented as follows.

$$r = C_1\left(\frac{Wbest}{T}\right) + C_2\left(\frac{Isup - Iinf}{(Isup - Iinf) + (T - Iinf)}\right) \quad \text{[Equation 2]}$$

Here, $Wbest$ represents the shortest routing time within an effective interval required for the forward Ant to move from a source node to a destination node and T denotes the current routing time. $Isup$ and $Iinf$ are approximated parameters representing the reliability of the average routing time, and $C_1$ and $C_2$ represent weights.

The definition of the reinforcement value is important to improve the performance of the AntNet. To properly appraise the relative quality of routing information, a method of varying the reinforcement is needed. A lot of methods for deciding an optimum reinforcement value have been proposed [M. Dorigo, M. Zlochin, N. Meuleau, and M. Birattari, "Updating ACO Pheromones using Stochastic Gradient Ascent and Cross-Entropy Methods]. Routing table values of the current node are updated using the reinforcement value obtained by Equation 2 as follows:

Pfd←Pft+r(1−Pfd)   [Equation 3]

Pnd←Pnd−rPnd r ∈ (0,1), n, f ∈ N, n≠f

Here, the reinforcement value r is larger than 0 but smaller than 1, and N is a set of all next nodes connected to the current node. In addition, f represents a next node through which the current Ant has passed to reach the destination node and n denotes other next nodes. $Pfd$ is the routing preference when the Ant passes through the next node f to arrive at the destination node and $Pnd$ is the preference when the Ant reaches the destination node using other next nodes. Referring to Equation 3, routing preference for the next node f is increased in proportion to the reinforcement value and routing preferences with respect to the other next nodes are decreased in proportion to the reinforcement value. In this way, a next node that has been frequently selected for previous Ants to travel and has excellent routing quality is selected as the next route.

Experimental results showing that the AntNet is superior to existing various adaptive routing techniques have been frequently published [G. Di Caro and M. Dorigo, "AntNet: Distributed stigmergetic Control for Communications Networks," Journal of Artificial Intelligence Research 9, pp. 317-365, December 1998; K. M. Sim and W. H. Sun, "Multiple Ant-Colony Optimization for Network Routing," Proc. of the First International Symposium on Cyber Worlds, pp. 277-281, November 2002; Y. Yang, A. N. Zincir-Heywood, M. I. Heywood, and S. Srinivas, "Agent-Based Routing Algorithms on a LAN," Proc. of the IEEE Canadian Conference on Electrical & Computer Eng., Vol. 3, pp. 1442-1447, May 2002]. However, the performance of AntNet is decided by the accuracy of network information obtained from Ant packets and thus it is important to increase the accuracy of the information for actual application of the AntNet.

The most important item of network information collected by the AntNet is routing time. To improve accuracy of the routing time, the Ant packet processing time at each node is minimized such that only information about routing time between nodes is included in the routing time. Furthermore, it is important to make Ant packet processing speeds at each node uniform to reduce an error in measuring the routing time. Moreover, it is also important to rapidly apply the routing time information to maximize general packet throughput. Accordingly, Ant packets are processed in a hardware manner by a packet processing device to minimize the processing speed and time. The routing time information is updated in the same manner to maximize its effect.

However, a conventional packet processing device such as a commercial network processor has a relatively simple computation unit because it is designed based on general network data, and processes complicated calculations in a software manner using a processor included therein. Although the Ant packet is sensitive to a processing speed, a relatively large amount of calculations and a separate computation unit are required for processing Ant information. Accordingly, it is effective to design an Ant processor using a separate logic only for Ant processing rather than using command-level general hardware.

SUMMARY OF THE INVENTION

Accordingly, the present invention is directed to an apparatus for implementing adaptive routing in packet switched networks that substantially obviate one or more problems due to limitations and disadvantages of the related art.

An object of the present invention is to provide a hardware structure for applying the AntNet to a system-on-chip (SoC) structure.

The hardware structure according to the present invention uses an existing AntNet algorithm modified to be suitable for hardware design for the purpose of minimizing and equalizing Ant processing time.

Still another objective of the present invention is to provide an apparatus for implementing adaptive routing in packet switched networks using routing tables, a traffic model structure and Ant packets of AntNet, comprising: a link selector for selecting a next node to which an Ant will be moved with reference only to a preference value in a current routing table; a reinforcement value calculator for calculating a reinforcement value in consideration only of the routing time of the Ant; an updating unit for updating values stored in the routing tables based on the reinforcement value and the collected routing information; and a controller for controlling logic for connecting the blocks to external devices and analyzing Ant packets upon arrival, wherein the Ant packet has a fixed length including a field Type representing whether an Ant packet is a forward Ant or a backward Ant, a field sNode representing IP address of a node that initially generates a current Ant, a field dNode representing the IP address of a final destination node of a current Ant, a field pNodeOdr representing the order of nodes the current Ant passes through while moving from a source node to the destination node, a field tNodeNum representing the number of the nodes the current Ant passes through while moving from the source node to the destination node, a field intNode representing the IP addresses of the nodes the current Ant passes through while moving from the source node to the destination node, and a field visTime representing the time at which the current Ant visits each node.

Other objective of the present invention is to provide a controller caring out its control operation through states including: a start state in which a forward Ant is generated when an Ant function starts and the forward Ant is transmitted to a next node based on the stored routing preferences; a forwarding state in which the Ant is forwarded when a current node is not a destination node, the fields pNodeOdr and tNodeNum are incremented by one whenever the Ant passes through a node, and the IP address of a visited node and time information are stored in the Ant; a destination state in which information about the current node is added to the Ant when the current node is the destination node, and the Ant is converted into a backward Ant to return to the node visited right before this state; a backwarding state in which routing preference and traffic model data stored in each node are updated using routing information as the backward Ant traces the nodes passed through by the forward Ant back to the source node, and the pNodeOdr value is decremented by one whenever the backward Ant passes through one node; and a source state in which the backward Ant updates routing preference and traffic model data of the source node when the backward Ant arrives at the source node and then the backward Ant is terminated.

DETAILED DESCRIPTION OF THE PREFERRED EMBODIMENT

Reference will now be made in detail to the preferred embodiments of the present invention, examples of which are illustrated in the accompanying drawings.

An apparatus for implementing adaptive routing in packet switched networks according to the present invention uses an algorithm modified such that the hardware processing load of the above-described AntNet is minimized without deteriorating the performance of the AntNet. Ant packet data suitable for the structure of the apparatus of the present invention will now be explained first.

1. Structure of Ant Packet

Figures 1, 2:
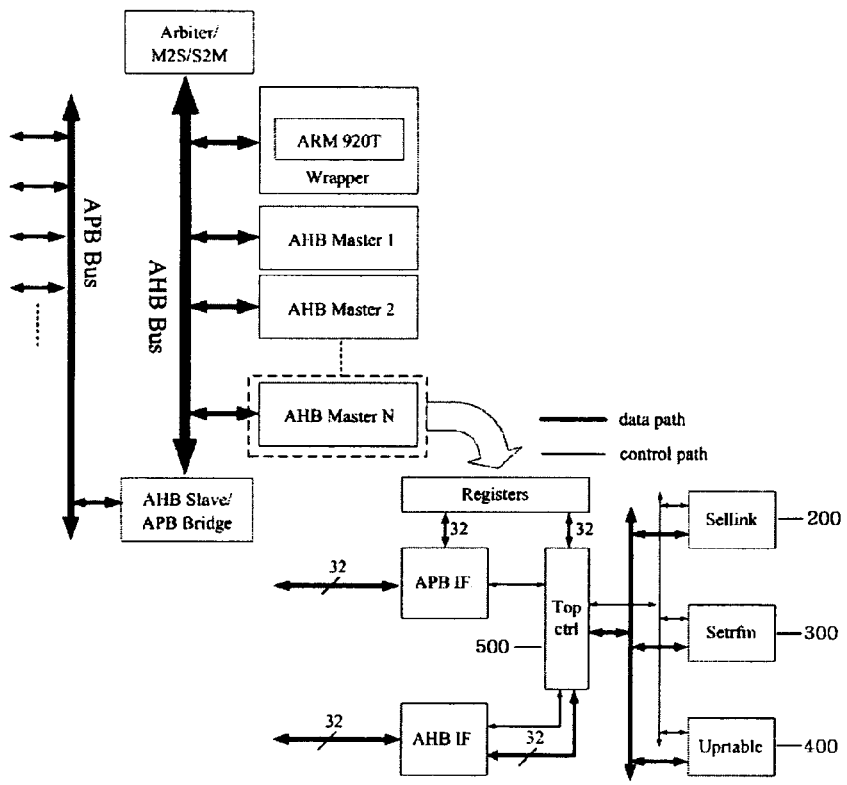
FIG. 1 illustrates the structure of an Ant packet.
FIG. 2 illustrates the construction of an apparatus according to the present invention.

The structure of an Ant packet optimized for the apparatus of the present invention is illustrated in FIG. 1. A single Ant packet has a size of 160 bytes. The size can be varied based on the kind of added information such as QoS service. The Ant defined so far contains only routing time information. The structure of the Ant shown in FIG. 1 is described below in detail.

Type: Representing whether the Ant is a forward Ant or a backward Ant.

sNode: IP address of a node that initially generates the current Ant.

dNode: IP address of a final destination node of the current Ant.

pNodeOdr: Order of nodes the current Ant passes through while moving from a source node to the destination.

tNodeNum: Number of nodes the current Ant passes through while moving from the source node to the destination.

intNode: IP addresses of the nodes the current Ant passes through while moving from the source node to the destination.

visTime: Time when the current Ant visits each node.

The length of the Ant is fixed for efficient hardware design. Accordingly, the number of nodes a single Ant can visit is limited to 12. In the Ant structure of FIG. 1, the sNode and dNode data are decided at the node that initially generates the Ant, while the other data items are automatically input at each node as the Ant is moved. The dNode is decided in a user designation mode or an automatic designation mode. A user decides the destination node in the user designation mode. In the automatic designation mode, the destination of a general data packet is randomly generated and used. Routing time information of the Ant is stored in the visTime that uses an existing network time protocol such as SNTP (Simple Network Time Protocol). The structure is based on SNTP Ver. 4 [RFC-2030: SNTPv4 for Ipv4 and Ipv6 and OSI, October 1996]. Time information per node is 64-bit and has a resolution of approximately 200 ps.

2. Overall Hardware Structure

The structure of the apparatus of the present invention is shown in FIG. 2. The apparatus has a structure designed specifically for processing the Ant packet shown in FIG. 1 and includes four main Ant processing blocks. The apparatus of the present invention was designed with a system-on-chip construction using ARM 920T [ARM DDI 0151C, ARM 920T (Rev 1) Technical Reference Manual, ARM Limited, April 2001; S. Furber, ARM System-on-Chip Architecture, Addison-Wesley, Great Britain 2000] as a main processor. The structure is based on AMBA bus Ver.2 [ARM IHI 0011A, AMBA (Rev 2) Specification, ARM Limited, 1999]. The apparatus is connected to an AHB bus that is a master block of the bus. Thus, the width of all addresses and data corresponds to 32 bits. A user can control detailed functions through register control. The register control is carried out using a controller such as UART supporting APB interface function [ARM DDI 0183E, Primecell UART (PL011) Technical Reference Manual, ARM Limited, December 2001]. The blocks composing the apparatus will now be explained.

A. Routing Table and Traffic Model (Not Shown)

The basic structures of a routing table and a traffic model are identical to those of the routing table and traffic model of the original AntNet algorithm, which are stored in an external memory. Assume that the number of next nodes connected to a current node is 10 and the number of destination nodes is 20, for example. The routing table is constructed of a two-dimensional structure of (10, 20) and the traffic model has data items for the 20 destination nodes because the traffic model is divided depending on the destination nodes. Data stored in the traffic model includes information such as the shortest routing time, average routing time and the scatter in the samples of routing time in the case of the AntNet. In the structure of the present invention, only the minimum value of routing time over a certain period of traffic history is stored in the traffic model. To reduce the quantity of calculations done by the hardware and simplify the hardware structure, the preference stored in the routing table is set to 1 byte such that the preference can be stored as an integer value of 0 through 255.

B. Link Selector (Sellink) 200

Figure 3:
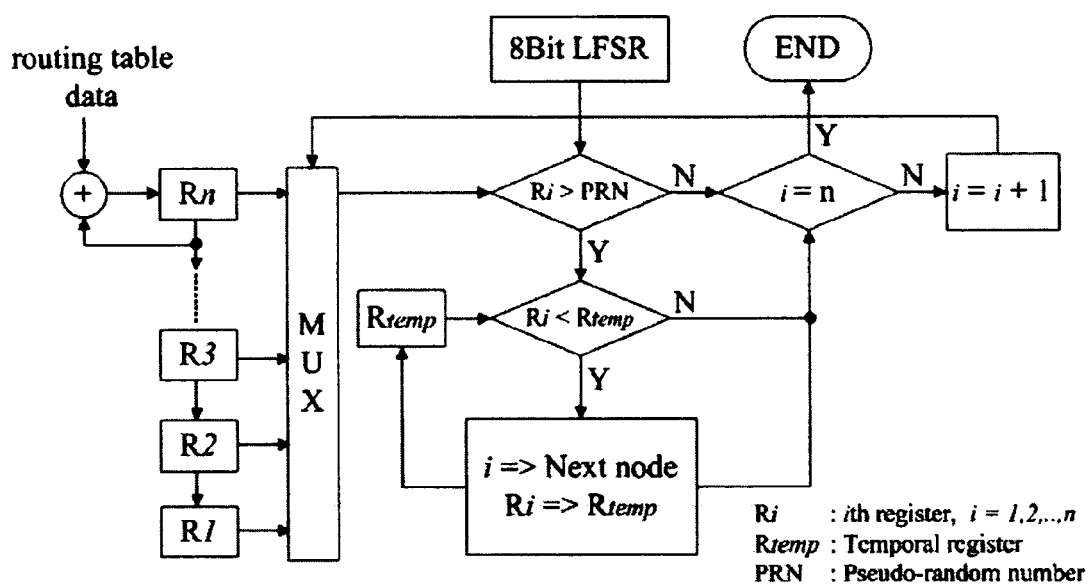
FIG. 3 is a flow chart showing a process of selecting a next node.

A link selector 200 selects a next node to which an Ant packet is moved from a current node. The link selector decides the next node with reference to only the preference stored in the routing table. Referring to FIG. 3, the routing is carried out by fetching preference values associated with next nodes having the same destination node as that of the current Ant from among routing table data stored in an external memory, and then accumulating the preference values in internal registers R1 through Rn in a predetermined order. The number of required registers is 10 because the number of next nodes connected to the current node is 10. Since the sum of the routing preference values of the next nodes having the same destination node is 255, each internal register can have a size of 1 byte. The values of the internal registers are sequentially compared with a value generated by a linear feedback shift register (LFSR) that generates a pseudo-random number of 1 through 255. When the comparison of all of the internal register values is finished, a next node is decided and the selected next node is changed into an IP address to which the Ant will be moved, with reference to a node-order-based IP address table previously defined in a register. The detailed operation of the link selector is shown in FIG. 3.

C. Reinforcement Value Calculator (Setrfm) 300

Figure 4:
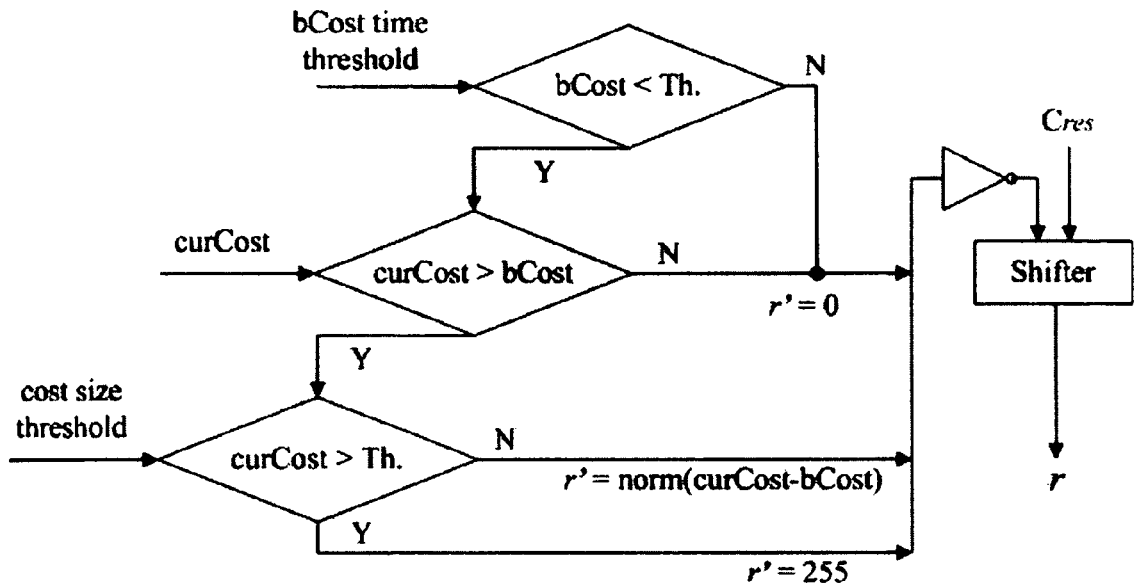
FIG. 4 is a flow chart showing a process of calculating a reinforcement value.

As described above, the reinforcement value is a parameter that calculates the quality of routing information to decide on correction values to apply to preference values stored in the routing table. While the AntNet introduced various components to decide the reinforcement value, the present invention considers only Ant routing time. The process of calculating the reinforcement value is shown in FIG. 4. In FIG. 4, assume that $^{bCost}$ is the shortest routing time from a next node n decided by the Ant to a destination node, $^{curCost}$ is the current routing time, and r' is a value obtained by normalizing the difference between the two values. Since r' simply means only the absolute difference between the two values, the actual reinforcement value is decided using a weight $^{Cres}$ based on the quality of the routing time as follows:

$$r' = \text{norm}(curCost - bCost) \quad \text{[Equation 4]}$$

$$r = \frac{255 - r'}{C_{res}} \quad \text{[Equation 5]}$$

In Equation 5, $^{Cres}$ is decreased as $^{bCost}$ is increased but increased as $^{bCost}$ is decreased. Since the optimum $^{Cres}$ varies depending on the network environment, the structure of the apparatus according to the present invention was designed such that $^{Cres}$ can be input from the outside as a parameter and $^{Cres}$ operation was implemented as a shifter in consideration of the hardware load. The shortest routing time $^{bCost}$ is initialized again after a predetermined effective time has elapsed in order to improve reliability of the reinforcement value using the latest routing information. Furthermore, the size of $^{curCost}$ is restricted in order to reduce calculation time and hardware size.

D. Updating Unit (Uprtable) 400

Figure 5:
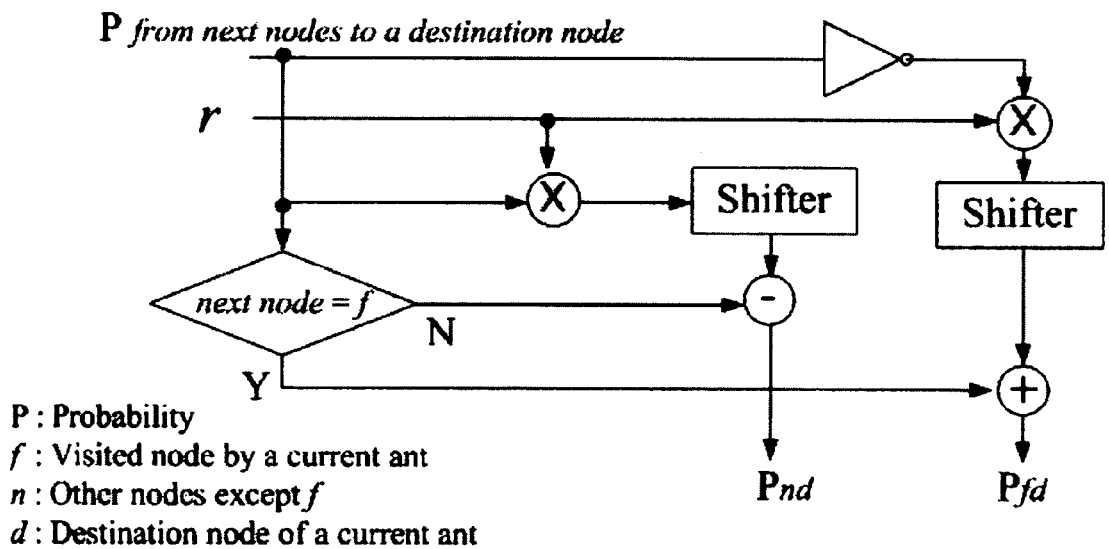
FIG. 5 is a flow chart showing a process of updating a routing table value.

The values stored in the routing table are updated in the updating unit 400 according to the reinforcement value and the newly collected routing information. The updating process is identical to that of the AntNet excepting a step of converting the reinforcement value into a value of 0 through 1 (referring to FIG. 5). FIG. 5 and Equation 6 show the process of updating preferences for the next nodes stored in the routing table.

$$Pfd < Pfd + \frac{r(255 - Pfd)}{256} \quad \text{[Equation 6]}$$

$$Pnd < Pnd - \frac{rPnd}{256}$$

$$n, f \in N, n \neq f$$

E. Controller (Topctrl) 500

A controller 500 controls logic for connecting functional blocks to external devices and analyzes Ant packets upon arrival. The control process is composed of five steps as shown in FIG. 6.

Figure 6:
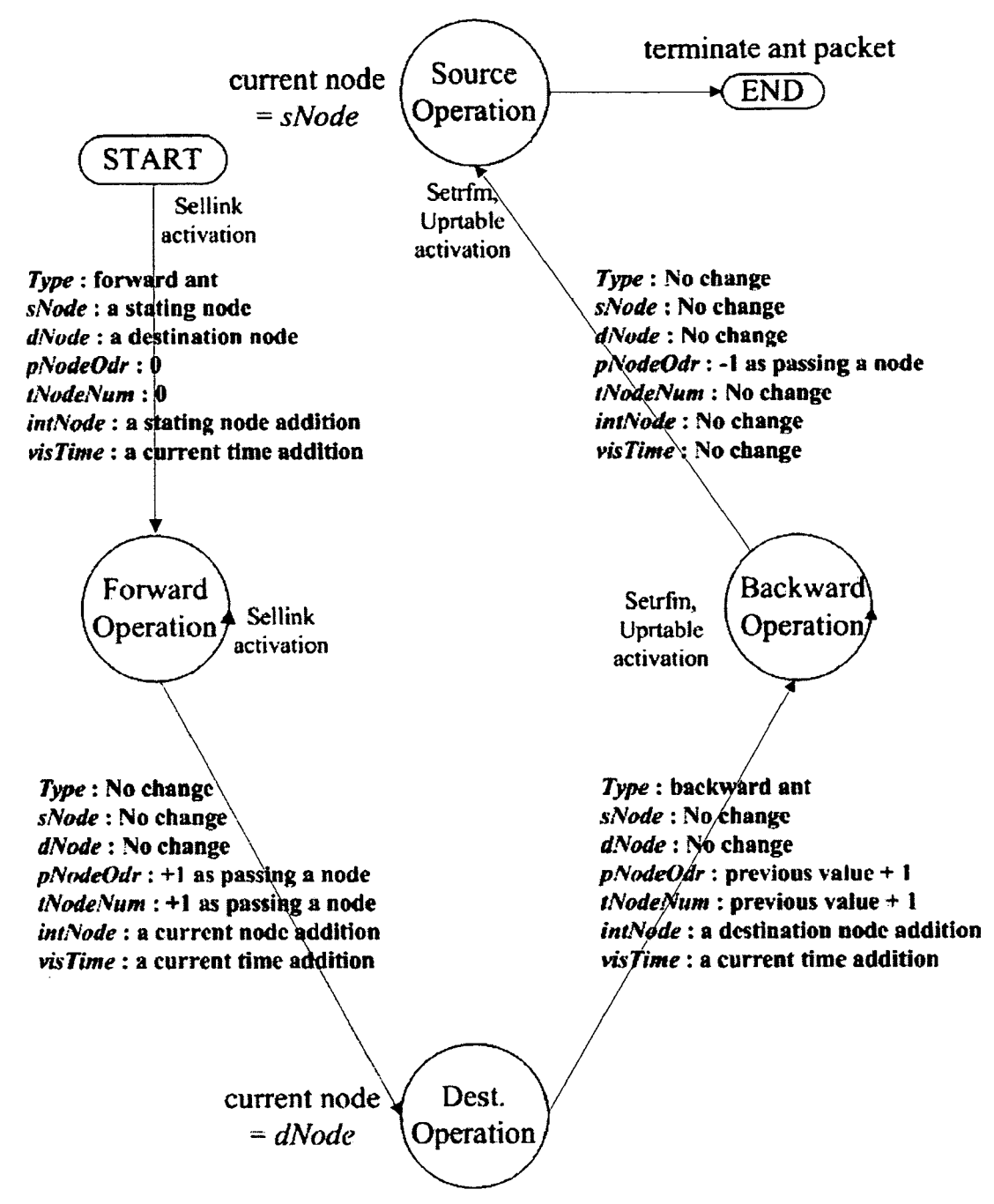
FIG. 6 is a state diagram of a Topctrl block.

Referring to FIG. 6, a forward Ant is generated when an Ant function starts and the forward Ant is transmitted to a next node based on the stored routing preferences in a start operation.

In a forwarding operation, the Ant is forwarded when a current node is not a destination node, and pNodeOdr and tNodeNum are incremented by one whenever the Ant passes through a node and the IP address of a visited node and time information are stored in the Ant.

When the current node is the destination node, a destination operation is performed, in which information about the current node is added to the Ant and the Ant is converted into a backward Ant to return to the node visited right before this operation.

In a backwarding operation, routing preference and traffic model data stored in each node are updated using the new routing information while the backward Ant traces the nodes passed by the forward Ant back to a source node. The value pNodeOdr is decremented by one whenever the backward Ant passes one node.

In a source operation, the backward Ant updates the routing preference and traffic model data of the source node upon arrival at the source node and then the backward Ant is terminated.

Two points must be checked before operations are decided at each node during a forward routing process. First, it is checked whether a circular route has been followed or not. The circular route means visiting a previously visited node while an Ant is moved from a source node to a destination node. The circular route must be removed because it allows the Ant to store erroneous routing information. The circular route is detected by checking the information intNode stored in the Ant to investigate whether the intNode is identical to the IP address of the current node or not. Second, the total number of nodes visited by the Ant should be checked. The above-described Ant packet can store information for a maximum of 12 nodes. Accordingly, when the Ant reaches the maximum value before arriving at the destination node, that node is judged to be the destination node and the Ant is converted into a backward node. Since Ants are periodically generated at many nodes in a network, performance deterioration due to loss of some of the Ants and interruption of routing is insignificant.

Figure 7:
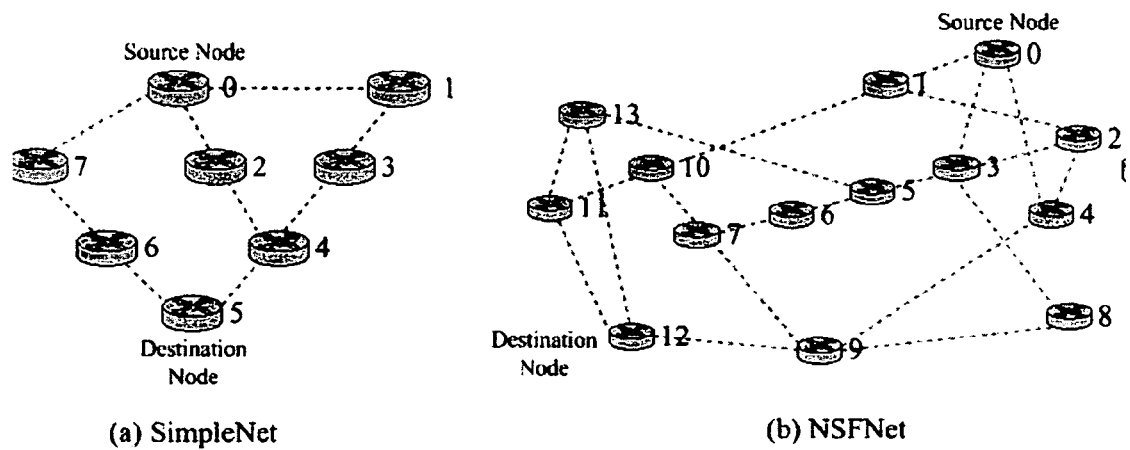
FIG. 7 illustrates test topology of experimental network nodes for testing the apparatus according to the present invention.

Performance Evaluation and Experimental Results:

The AntNet algorithm modified to work with the hardware structure according to the present invention was compared with the original AntNet algorithm in various network environments and the performance of the modified AntNet algorithm was evaluated. The network structure used as an experimental environment is shown in FIG. 7. The structure of FIG. 7 is a part of various network structures used for inspecting the performance of the AntNet. "SimpleNet" is a network structure constructed of 8 network nodes and 9 two-way links and "NSFNet" is a network structure including 14 network nodes and 21 two-way links. A number given to each node represents a node identifier.

The evaluation was implemented based on a variation in routing preference in the routing table of each node. Particularly, a preference variation in proportion to the number of updates at a source node was observed. Here, the number of updates means the number of times a preference is updated or the number of Ants visiting a corresponding node. The following four network states were considered for experiments:

Normal state: All traffic in a network is uniformly distributed such that there is little routing time difference between nodes.

Biasing state: Routing time consumed is remarkably short because traffic between specific nodes is lighter than other traffic.

Heavy state: There is a vast amount of traffic while the traffic is uniformly distributed as in the normal state and thus average routing time is at least ten times longer than that in the normal state.

Dynamic state: The network traffic pattern is periodically varied.

Assume that the normal, biasing and heavy states are periodically repeated in experiments.

Experiments were finished when any one routing preference of a source node became dominant over the other preferences by at least a predetermined difference in the case of a fixed traffic pattern such as the normal, biasing and heavy states. In the dynamic state, the experiments were stopped after a predetermined time passed. An Ant is periodically generated at the source node, and the number of simultaneously activated Ants is restricted to 30 in consideration of the number of nodes of the network.

1. SimpleNet

In the SimpleNet structure, experiments were implemented on the assumption that a source node is the node 0 and a destination node is the node 5. In this case, there are three available routes to the destination node. The first route is 0-1-3-4-5, the second route is 0-2-4-5 and the third route is 0-7-6-5. Accordingly, routing preferences activated for the destination node 5 include P15, P25 and P75 in the routing table of the source node 0. The following experimental results represent variations in the three routing preferences in proportion to the number of updates in various network states.

Figure 8:
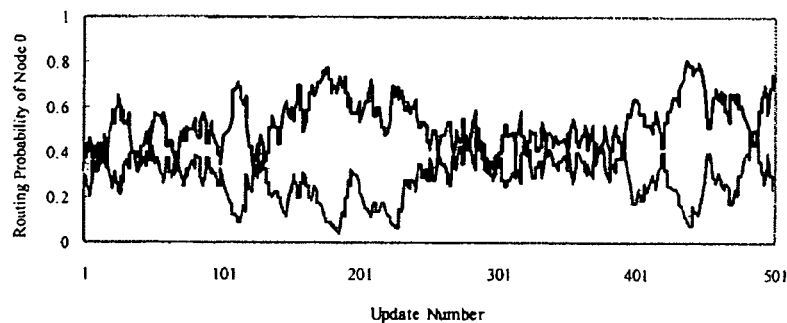
FIG. 8 shows a SimpleNet experimental result in a normal state.
Figure 8:
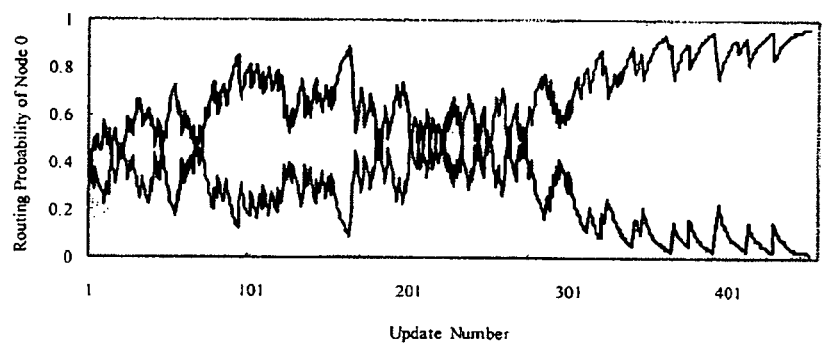

The routing preferences are affected according to the distance between the source node and the destination node, that is, the number of visited nodes, because there is little routing time difference between nodes in the normal state. Accordingly, P25 and P75, which have relatively short routes, are dominant over P15. Although a difference between P25 and P75 can be generated based on the number of times each route is randomly selected, the selection of one of the two routes does not affect routing quality. FIG. 8 shows an experimental result in the normal state. Referring to FIG. 8, P25 and P75 are repeatedly alternated in the case of the original AntNet algorithm whereas one of P25 and P75 is preferentially selected after a predetermined time has elapsed in the case of the modified algorithm. The difference between the original algorithm and modified algorithm is generated because the effect of a pseudo random number generated by an LFSR on the modified algorithm is larger than the effect of the pseudo random number on the original algorithm. A continued oscillation of preference means that dominance/recessiveness between corresponding routes is not distinct such that there is a large variation in the selection of one of the routes. However, P25 and P75 were dominant over P15 in both the original algorithm and modified algorithm.

Figure 9:
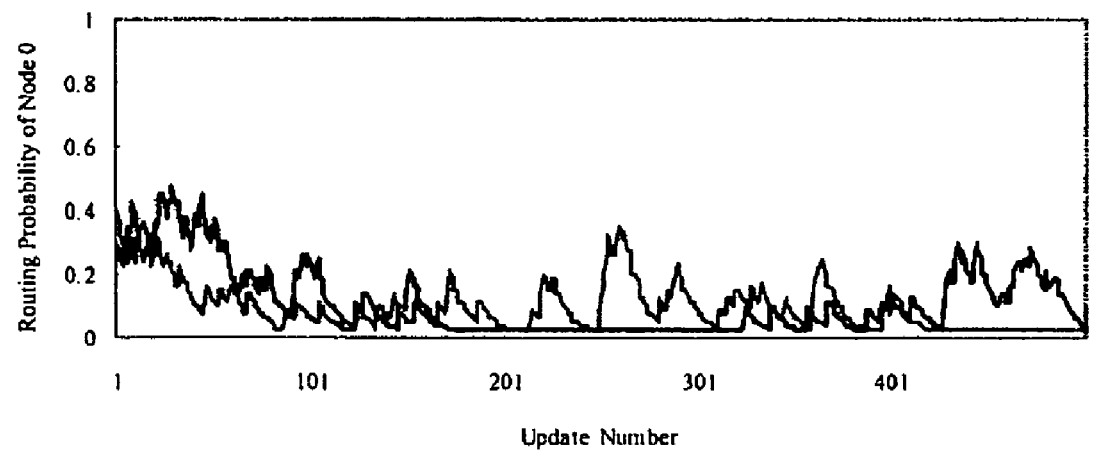
FIG. 9 shows a SimpleNet experimental result in a biasing state.
Figure 9:
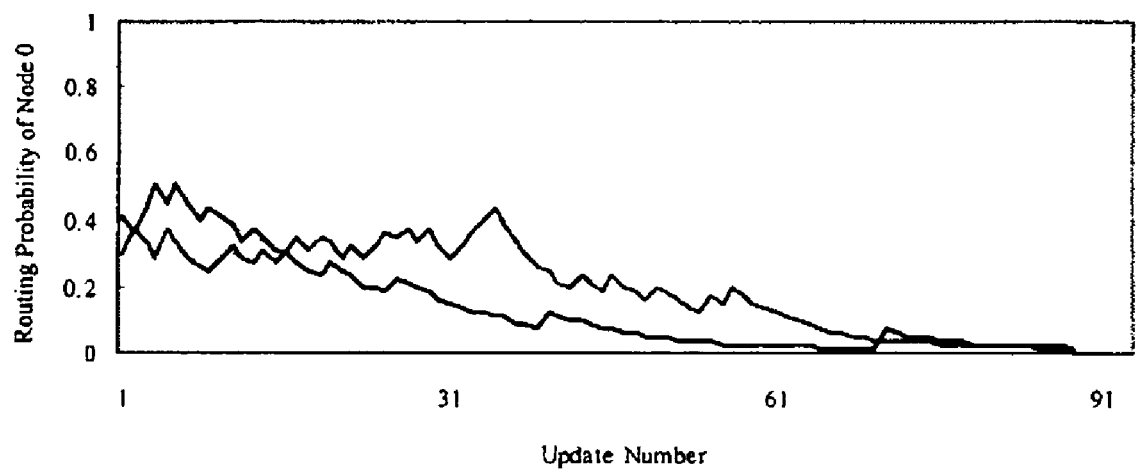

Assume that routing time of the route 0-1-3-4-5 is shorter than routing time of the other two routes in the biasing mode. In this case, P15 is definitely dominant at a small update number without oscillation, distinguished from the normal mode. FIG. 9 shows an experimental result.

Figure 10:
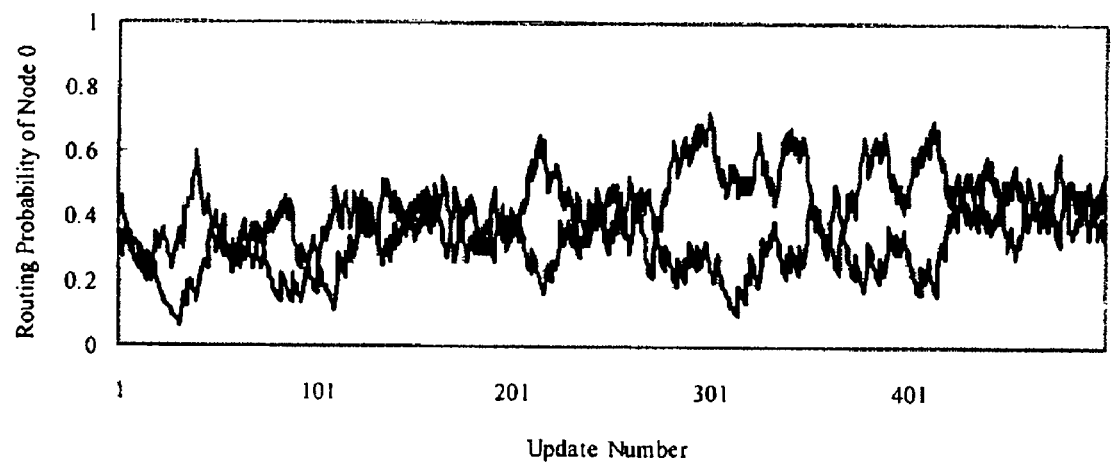
FIG. 10 shows a SimpleNet experimental result in a heavy state.
Figure 10:
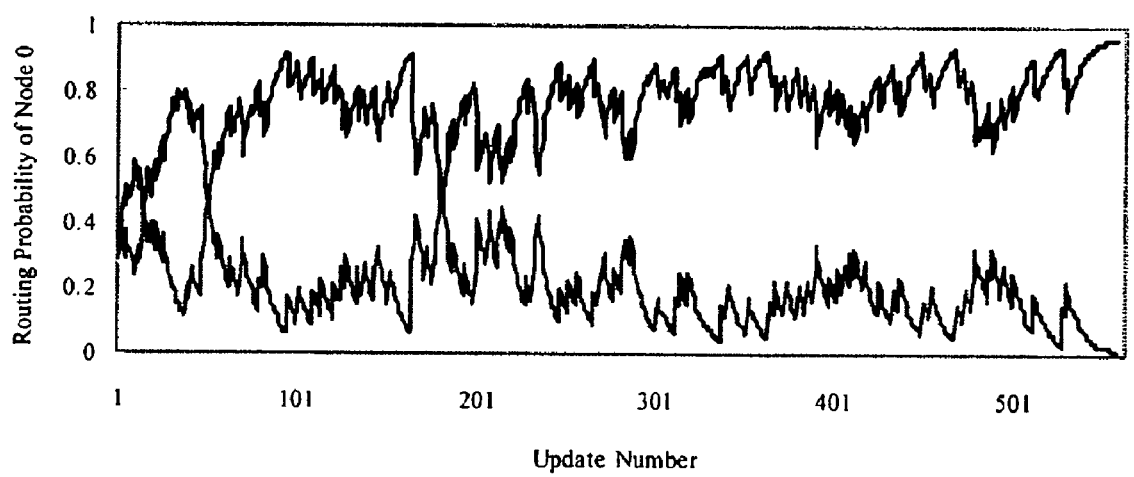

In the heavy state where network traffic is remarkably increased, the difference between the routes is considerably reduced compared to the normal state when the difference is not increased in proportion to the network traffic. Referring to FIG. 10, the number of oscillations is increased and oscillation width is reduced in the case of the original algorithm. According to the modified algorithm of the present invention, dominance of one of the two routs is not fixed but continuous oscillation is generated. However, P25 and P75 are dominant over P15 as in the normal state.

Finally, the network environment was cycled through normal, biasing and heavy modes based on 500 routing preference updates in order to construct a varying network environment. The original AntNet algorithm requires a long period of time to be adapted to a new environment because there are many components that should be considered to select an optimized route.

Figure 11:
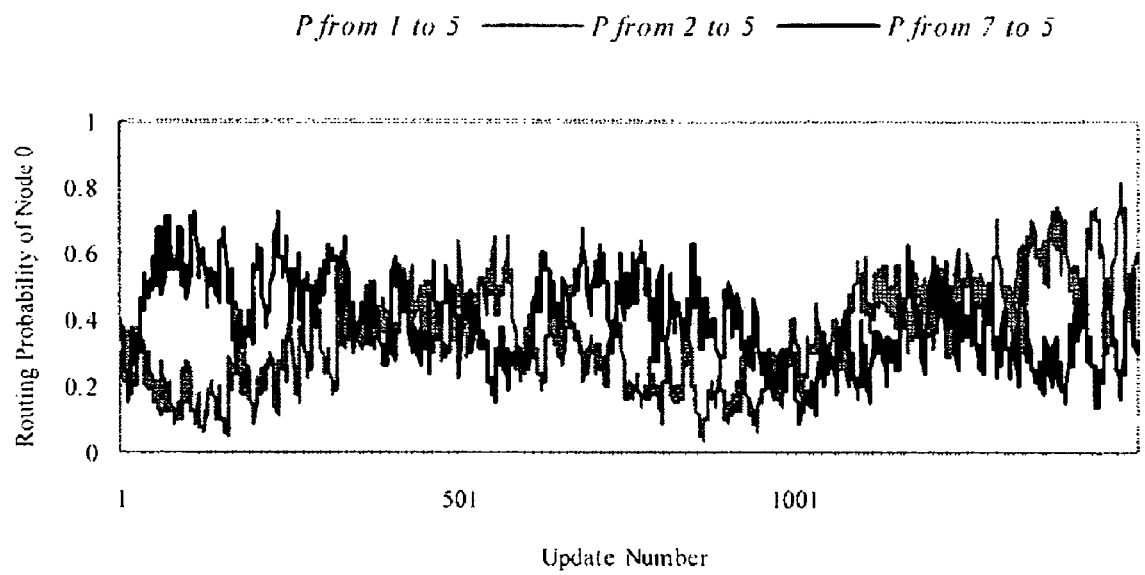
FIG. 11 shows a SimpleNet experimental result in a dynamic state.
Figure 11:
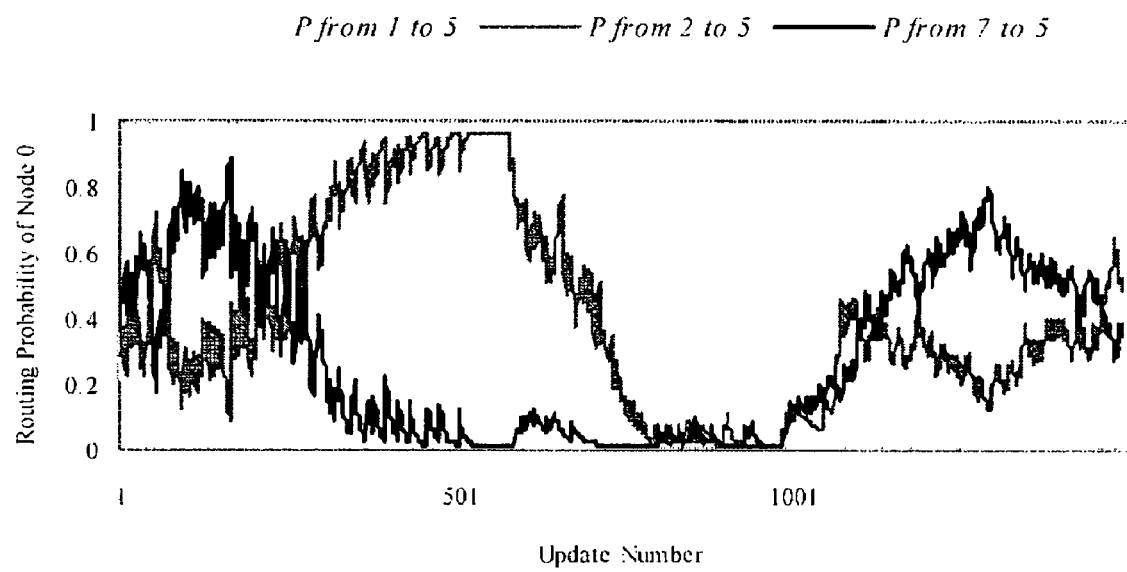
Figure 12:
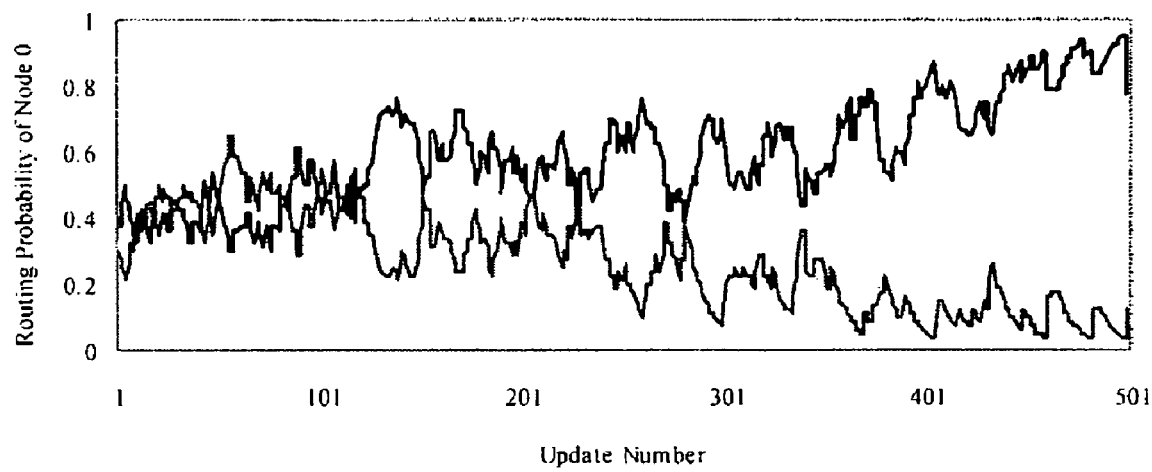
FIG. 12 shows an NSFNet experimental result in a normal state.
Figure 12:
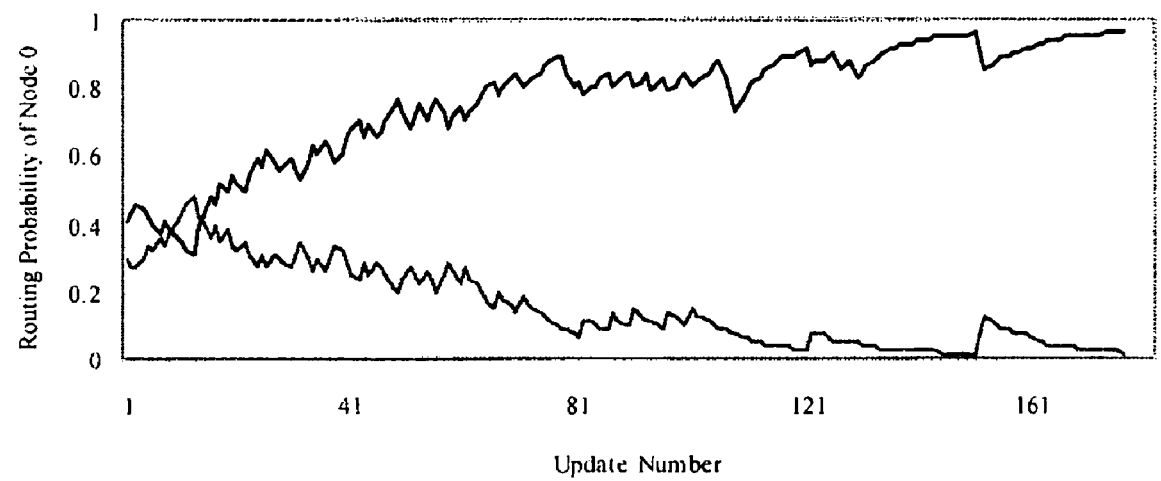
Figure 13:
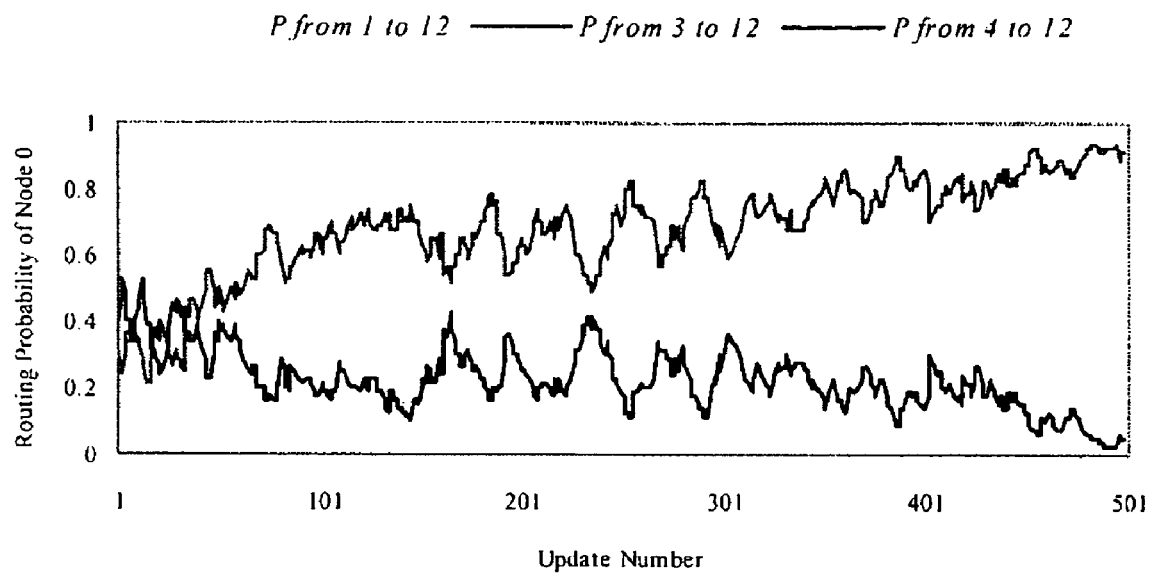
FIG. 13 shows an NSFNet experimental result in a biasing state.
Figure 13:
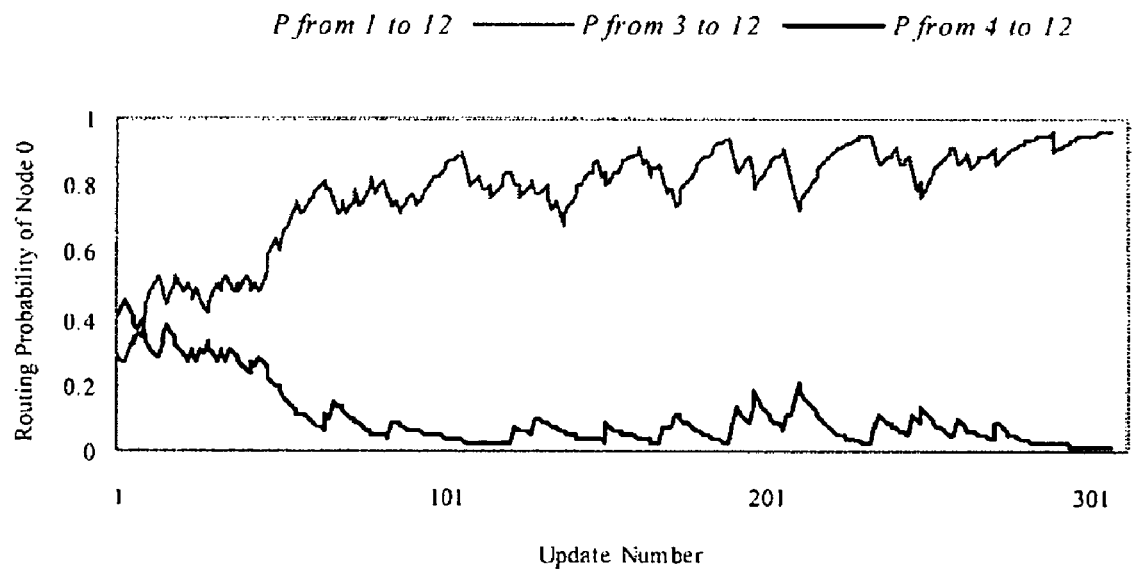
Figure 14:
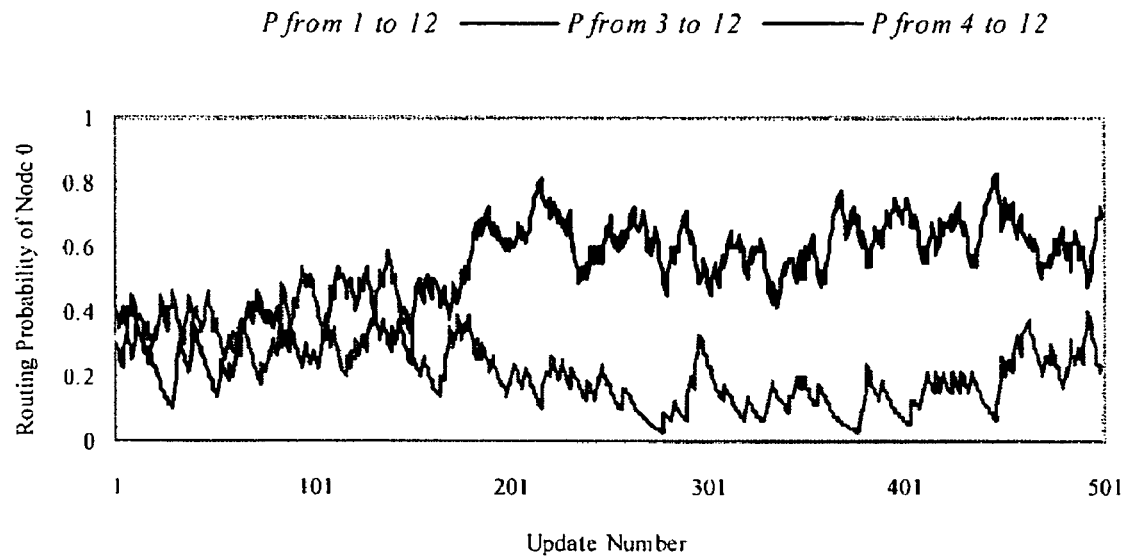
FIG. 14 shows an NSFNet experimental result in a heavy state.
Figure 14:
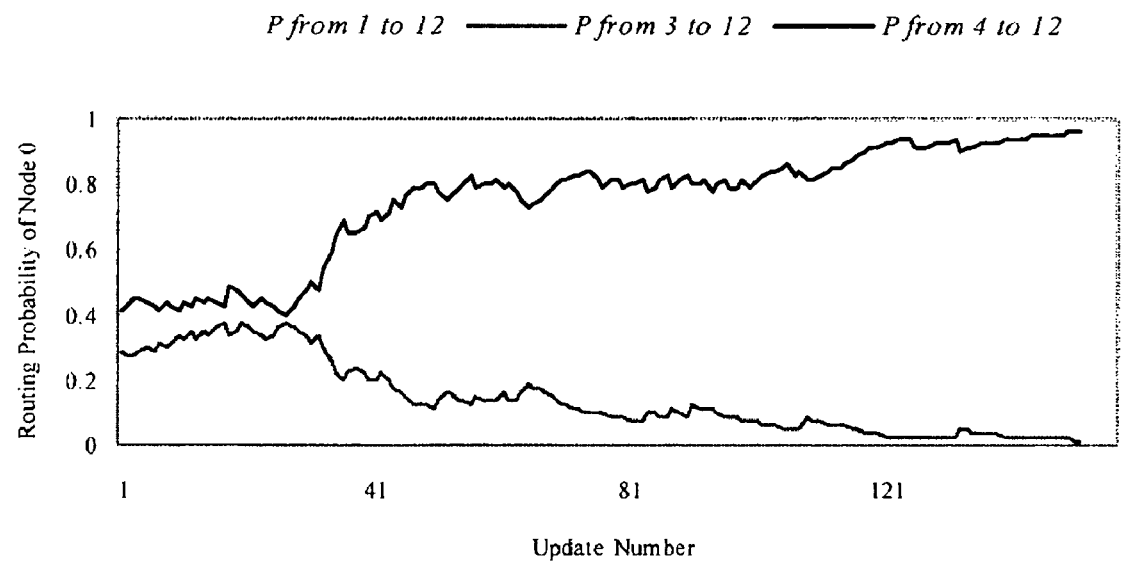
Figure 15:
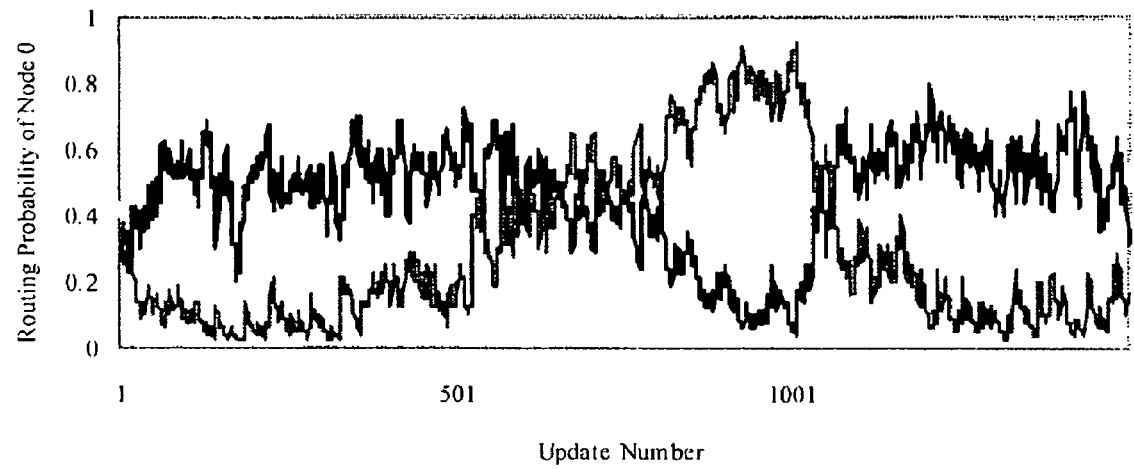
FIG. 15 shows an NSFNet experimental result in a dynamic state.
Figure 15:
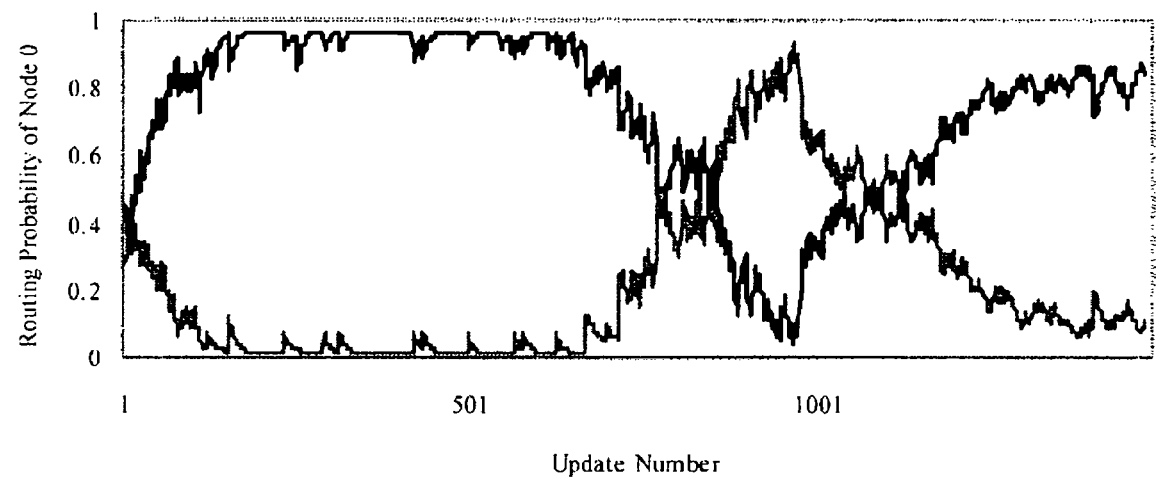

However, the modified algorithm is a simple structure that considers only routing time of an Ant—thus it needs only a short time to adapt to a traffic variation. Referring to FIG. 11, a routing tendency of the original algorithm is similar to the case of a fixed traffic pattern but a considerably long period of time is required to select a new route when the traffic pattern is changed, and oscillation is remarkably increased. On the contrary, the modified algorithm has excellent adaptability to a change in the traffic pattern.

2. NSFNet

Assume that a source node is 0 and a destination node is 12 in the case of NSFNET. The number of options when selecting a route from the source node to the destination node in the NSFNet is considerably increased compared to the SimpleNet because the NSFNet has many branch nodes. Variations in routing preferences P1,12, P3,12 and P4,12 for the destination node 12 at the source node were observed. In the normal and heavy modes in which traffic is uniformly distributed, routing speed is superior for the route with the shortest distance between the source node and destination node, that is, the route 0-4-9-12. Thus, P4,12 is the most dominant in both the original algorithm and the modified algorithm. However, P4,12 converges very fast without having severe oscillation in the case of the modified algorithm because the shortest route is very much shorter than other routes and thus dominance and recessiveness is definitely distinguished from each other.

Assume that the route 0-3-5-6-7-9-12 has the shortest routing time in the biasing mode. In this case, P3,12 converges within a short period of time even though the number of transited nodes is increased. However, convergence time is increased due to many branch nodes in both the original algorithm and modified algorithm when the routing time difference between routes is not large, and the second best route having only a small routing time difference can be selected. In the dynamic mode, an experimental result similar to the experimental result of the SimpleNet was obtained and a variation in preferences was definite in response to a network environment. Experimental results with respect to the NSFNet are shown in FIGS. 12, 13, 14 and 15.

It is confirmed that the modified AntNet algorithm has performance similar to that of the original AntNet algorithm irrespective of environment, size and structure of a network through the aforementioned experiments. The modified AntNet algorithm was embodied in RTL code in a hardware structure. The verilog HDL was used as the RTL code and the modified algorithm was inspected using Seamless, which is a hardware/software integrated inspection environment of Mentor [Seamless CVE User's and Reference Manual, v4.3, Mentor Graphics Corp., 2002]. The Ant processing time largely depends on a period of time required for obtaining the right to use the AHB bus and waiting time required for accessing external memory rather than actual calculation time. The priority of Ant processing in the system needs to be increased in order to achieve uniform processing time. The result of design (excepting a register set) using the TSMC 0.25 m library has an approximately 60K gate size based on a 100 MHz system clock and the size of the used external memory is (m*n+4*n) bytes, where m is the sum of next nodes and n is the sum of destination nodes.

According to the above-described experiments, it can be confirmed that the algorithm modified to be suitable for the hardware implementation of the present invention shows performance similar to that of the original AntNet algorithm in a virtual network environment. The hardware design and composition result shows that the modified algorithm is effective when the AntNet-based routing function is realized in a system-on-chip system. Furthermore, a large part of hardware design is constructed such that it can be controlled by external parameters to enable function extension and experiments for the future because much research is being carried out regarding the details of AntNet functions, for example, a function of calculating the reinforcement value.

As described above, the present invention proposes a hardware structure based on the AntNet algorithm that applies the behavior pattern of the ant colony to a network to adaptively select an optimized route in a varying environment. Ants used for collecting network environment information must be processed at a hardware level to achieve short, uniform processing times. This improves reliability of routing information to enable accurate operations in the actual environment. The hardware structure of the present invention can be applied to a network device such as a network processor supporting AntNet protocol to provide functions suitable for future network environments.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for implementing adaptive routing in packet switched networks using routing tables, a traffic model structure and Ant packets of AntNet, comprising:

a link selector for selecting a next node to which an Ant will be moved with reference only to a preference value in a current routing table;

a reinforcement value calculator for calculating a reinforcement value in consideration only of the routing time of the Ant;

an updating unit for updating values stored in the routing tables based on the reinforcement value and the collected routing information; and a controller for controlling logic for connecting the blocks to external devices and analyzing Ant packets upon arrival, wherein the Ant packet has a fixed length including a field Type representing whether an Ant packet is a forward Ant or a backward Ant, a field sNode representing IP address of a node that initially generates a current Ant, a field dNode representing the IP address of a final destination node of a current Ant, a field pNodeOdr representing the order of nodes the current Ant passes through while moving from a source node to the destination node, a field tNodeNum representing the number of the nodes the current Ant passes through while moving from the source node to the destination node, a field intNode representing the IP addresses of the nodes the current Ant passes through while moving from the source node to the destination node, and a field visTime representing the time at which the current Ant visits each node.

2. The apparatus as claimed in claim 1, wherein the link selector comprises:

means for fetching preference values associated with next nodes having the same destination node as that of the current Ant from among routing table data stored in an external memory;

means for comparing internal registers with a value generated by a linear feedback shift register that generates a pseudo-random number when the fetched values are accumulated in the internal registers in a predetermined order;

means for deciding a next node when the comparison is finished and converting the decided next node into an actual IP address to which an Ant will be moved with reference to a node-order-based IP address table previously defined in a register.

3. The apparatus as claimed in claim 1, wherein the reinforcement value r calculated by the reinforcement value calculator is represented as follows:

$$r = \frac{255 - r'}{C_{res}}.$$

(Here, $r'=norm(curCost-bCost)$, $bCost$ is the shortest routing time from the next node n decided by the Ant to the destination node d, and $curCost$ is the current routing time).

4. The apparatus as claimed in claim 3, wherein the variable $bCost$ is initialized again after a predetermined time has elapsed to improve reliability of the reinforcement value by using the latest routing information.

5. The apparatus as claimed in claim 1, wherein the updating unit updates preferences for next nodes, stored in the routing tables, according to the following equation:

$$Pfd \leftarrow Pfd + \frac{r(255 - Pfd)}{256}$$

$$Pnd \leftarrow Pnd - \frac{rPnd}{256}$$

$$n, f \in N, n \neq f$$

6. The apparatus as claimed in claim 1, wherein the controller carries out its control operation through states including:
- a start state in which a forward Ant is generated when an Ant function starts and the forward Ant is transmitted to a next node based on the stored routing preferences;
- a forwarding state in which the Ant is forwarded when a current node is not a destination node, the fields pNodeOdr and tNodeNum are incremented by one whenever the Ant passes through a node, and the IP address of a visited node and time information are stored in the Ant;
- a destination state in which information about the current node is added to the Ant when the current node is the destination node, and the Ant is converted into a backward Ant to return to the node visited right before this state;
- a backwarding state in which routing preference and traffic model data stored in each node are updated using routing information as the backward Ant traces the nodes passed through by the forward Ant back to the source node, and the pNodeOdr value is decremented by one whenever the backward Ant passes through one node; and
- a source state in which the backward Ant updates routing preference and traffic model data of the source node when the backward Ant arrives at the source node and then the backward Ant is terminated.

\* \* \* \* \*